United States Patent [19]
Hainaut et al.

[11] 3,865,854

[45] Feb. 11, 1975

[54] PROCESS OF PREPARATION OF ALKYL TRIDECATRIENOATES AND INTERMEDIATES

[75] Inventors: Daniel Hainaut, Villemomble; Edmond Toromanoff, Paris; Jean-Pierre Demoute, Montreuil-Sous-Bois, all of France

[73] Assignee: Roussel-Uclaf, Paris, France

[22] Filed: Sept. 5, 1972

[21] Appl. No.: 286,439

[30] Foreign Application Priority Data

Sept. 7, 1971 France .............................. 71.32261

[52] U.S. Cl. ................. 260/410.9 R, 260/327 TH, 260/348 A, 260/DIG. 44, 424/312, 424/DIG. 12
[51] Int. Cl. ...................... C07c 67/00, C07c 65/08
[58] Field of Search .............................. 260/410.9 R

[56] References Cited
UNITED STATES PATENTS
3,184,516  5/1965  Chechak et al. ........................ 260/66

*Primary Examiner*—Lewis Gotts
*Assistant Examiner*—Diana G. Rivers
*Attorney, Agent, or Firm*—Hammond & Littell

[57] ABSTRACT

A process for the production of alkyl 3,11-dimethyl-7-ethyl-2,6,10-tridecatrienoates starting from the S-oxide of 4-methyl-5,6-dihydro-2H-thiapyran, 1-oxa-6-thia-spiro/2,5/octane and alkyl 3-methyl-4-halo-2-butenoate and the novel intermediates. The alkyl 3,11-dimethyl-7-ethyl-2,6,10-tridecatrienoates are intermediates in the synthesis of the juvenile hormone.

12 Claims, No Drawings

PROCESS OF PREPARATION OF ALKYL TRIDECATRIENOATES AND INTERMEDIATES

OBJECTS OF THE INVENTION

An object of the present invention is the development of a process for the production of alkyl tridecatrienoates having the formula

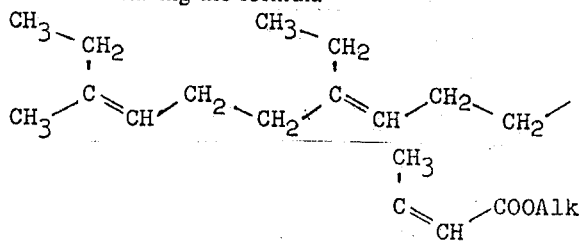

wherein Alk represents alkyl having 1 to 5 carbon atoms which consists of the steps of (1) condensing the S-oxide of 4-methyl-5,6-dihydro-2H-thiapyran with 1-oxa-6-thiaspiro/2,5/octane in the presence of a strong base, (2) reducing the resulting S-oxide of 2(4'-hydroxy-3',4',5',6'-tetrahydrothiapyranyl-4'-methyl)-4-methyl-5,6-dihydro-2H-thiapyran having the formula

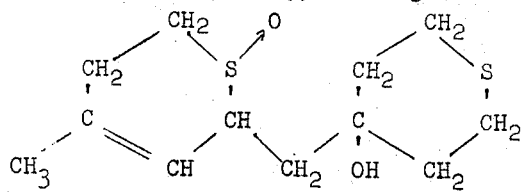

by the action of a sulfoxide reducing agent, (3) dehydrating the resulting 2-(4'-hydroxy-3',4',5',6'-tetrahydrothiapyranyl-4'-methyl)-4-methyl-5,6-dihydro-2H-thiapyran having the formula

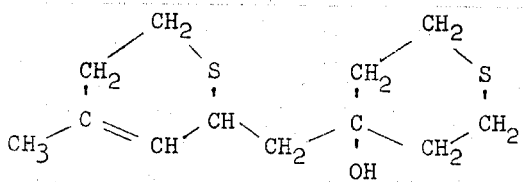

by the action of a dehydrating agent (4) recovering a dithiapyranic compound having the formula

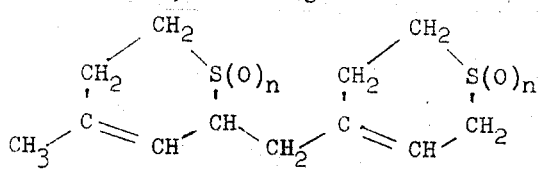

wherein $n$ represents an integer from 0 to 2 and reacting the same with a butenoate having the formula

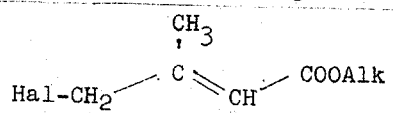

wherein Alk represents alkyl having 1 to 5 carbon atoms and Hal represents a halogen selected from the group consisting of chlorine and bromine, in the presence of a strong base, (5) subjecting the resulting dithiapyranic ester compound having the formula

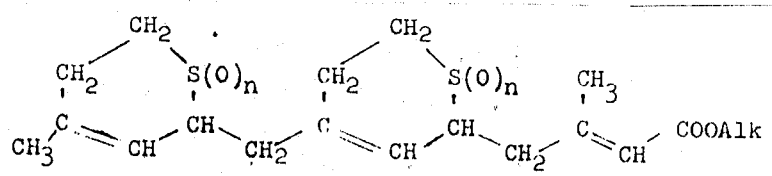

wherein Alk and n have the above-assigned values, to — a reduction and a desulfurization, and (6) recovering said alkyl tridecatrienoates.

Another object of the present invention is the obtaining of the novel intermediates:

1. Compounds having the formula

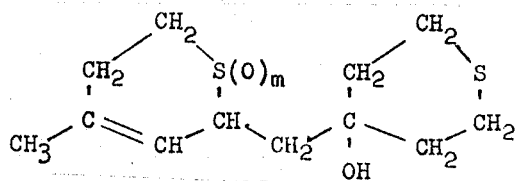

wherein $m$ represents an integer from 0 to 2;

2. Compounds having the formula

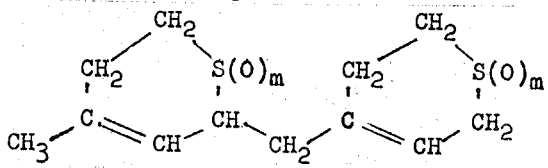

wherein $m$ represents an integer from 0 to 2; and

3. Compounds having the formula

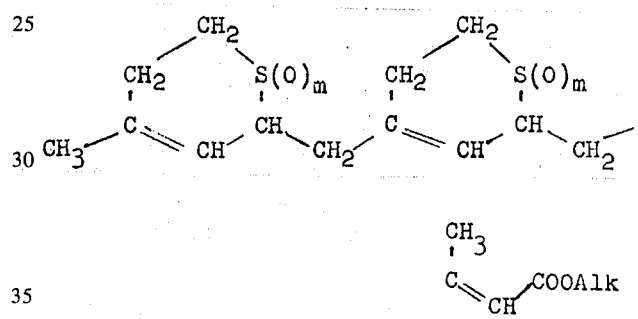

wherein $m$ represents an integer from 0 to 2 and Alk represents an alkyl having from 1 to 5 carbon atoms.

These and other objects of the invention will become more apparent as the description thereof proceeds.

DESCRIPTION OF THE INVENTION

The above objects have been achieved by the development of a process for the production of alkyl tridecatrienoates having the formula

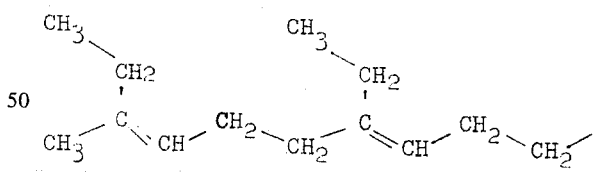

wherein Alk represents an alkyl having from 1 to 5 carbon atoms. These alkyl 3,11-dimethyl-7-ethyl-2,6,10- tridecatrienoates may also be represented by the formula I

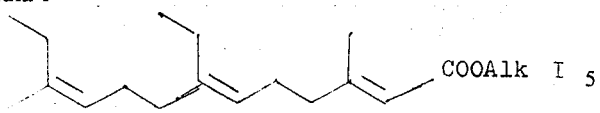

wherein alkyl indicates a hydrocarbon chain having from 1 to 5 carbon atoms and preferably methyl, ethyl, propyl, isopropyl, butyl, isobutyl and tert.-butyl.

The compounds of the general formula I possess a very important industrial interest, since they are, in particular, intermediates for the synthesis of the juvenile hormone of H. Cecropia which is methyl 3,11-dimethyl-7-ethyl-10-epoxy-2,6-tridecadienoate and its analogs. It is known that the juvenile hormone is a natural product which can be extracted from the abdominal tissues of the adult male of Hyalophora Cecropia [Williams, Nature, London, 178, 212 (1956)]. The juvenile hormone possesses a biological activity and particularly a very interesting insecticidal activity. It is also known that due to the costly and uncertain supply of the starting material, and to a difficult purification, the extraction processes have been abandoned in favor of synthetic methods. Numerous processes of preparation of the juvenile hormone are known. (See among others on this subject Dahm [J. Am. Chem. Soc. 89, 5292 (1967)].) However, all the known processes present a certain number of inconveniences. These processes are either multistep linear syntheses, and thus rarely commercialized because particularly of the very important number of steps, or multistep convergent syntheses which do not present sufficient stereospecific characteristics.

It is known that especially the isomer possessing the structure of the juvenile hormone presents a biological activity of the highest interest. This is the E.E.Z. isomer of methyl 3,11-dimethyl-7-ethyl-10-epoxy-2,6-tridecadienoate.

The present invention has precisely the object of a process which permits obtaining with the aid of a convergent and entirely stereoselective synthesis, the intermediate compounds corresponding to the most active isomer of methyl 3,11-dimethyl-7-ethyl-10-epoxy-2,6-tridecadienoate and its analogs, and that object in a relatively few number of synthesis steps and with interesting yields.

The process of the invention is essentially characterized in that (1) the S-oxide of 4-methyl-5,6-dihydro-2H-thiapyran of formula II

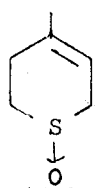

is condensed with 1-oxa-6-thia-spiro/2,5/octane of formula III

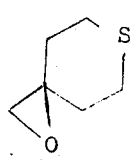

in the presence of a strong base, (2) the resulting S-oxide of 2-(4'-hydroxy-3',4',5',6'-tetrahydrothiapyranyl-4'-methyl)-4-methyl-5,6-dihydro-2H-thiapyran of formula IV

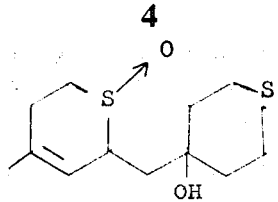

is treated with a reducing agent, (3) the resulting 2-(4'-hydroxy-3',4',5',6'-tetrahydrothiapyranyl-4'-methyl)-4-methyl-5,6-dihydro-2H-thiapyran of formula V

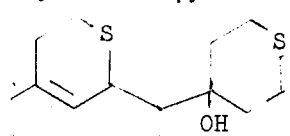

is treated with a dehydrating agent, (4) the resulting 2-(5',6'-dihydro-2'H-thiapyranyl-4'-methyl)-4-methyl-5,6-dihydro-2H-thiapyran of formula VI

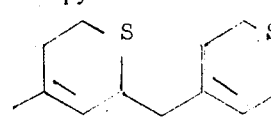

is reacted with an oxidizing agent, (5) the resulting S,S'-dioxide of 2-(5',6'-dihydro-2'H-thiapyranyl-4'-methyl)-4-methyl-5,6-dihydro-2H-thiapyran of formula VII

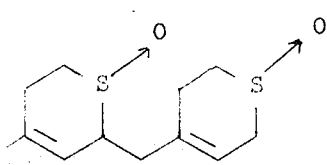

is condensed with an alkyl 3-methyl-4-halo-2-butenoate of the formula VIII

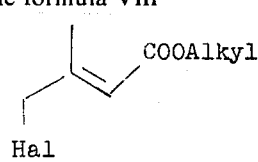

wherein Hal represents a bromine or chlorine and alkyl represents a hydrocarbon chain having from 1 to 5 carbon atoms, in the presence of a strong base, (6) the resulting S,S'-dioxide of alkyl β-methyl-γ-[4-(4'-methyl-5',6'-dihydro-2'H-thiapyranyl-2'-methyl)-5,6-dihydro-2H-thiapyran-2-yl]-α-butenoate of formula IX

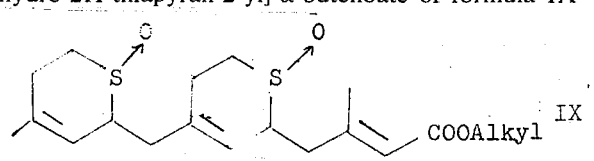

wherein alkyl has the above-assigned values, is treated with a reducing agent, and (7) the resulting alkyl β-methyl-γ-[4-(4'-methyl-5',6'-dihydro-2'H-thiapyranyl-2'-methyl)-5,6-dihydro-2H-thiapyran-2-yl]-α-butenoate of formula X

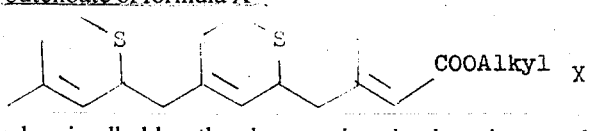

wherein alkyl has the above-assigned values, is treated with a desulfurizing agent to give a compound of formula I

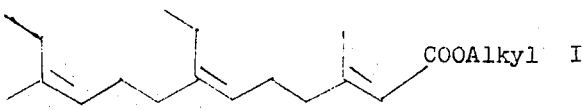

According to the invention it is also possible to prepare the alkyl β-methyl-γ-[4-(4'-methyl-5',6'-dihydro-2'H-thiapyranyl-2'-methyl)-5,6-dihydro-2H-thiapyran-2-yl]-α-butenoate of the formula X without having to recourse, on the one hand, to the oxidation of the sulfur atoms of 2-(5',6'-dihydro-2'H-thiapyranyl-4'-methyl)-4-methyl-5,6-dihydro-2H-thiapyran of formula VI, and, on the other hand, to the reduction of the S,S'-dioxide of the alkyl β-methyl-γ-[4-(4'-methyl-5',6'-dihydro-2'H-thiapyranyl-2'-methyl)-5,6-dihydro-2H-thiapyran-2-yl]-α-butenoate of formula IX. This process for preparing the alkyl β-methyl-γ-[4-(4'-methyl-5',6'-dihydro-2'H-thiapyranyl-2'-methyl)-5,6-dihydro-2H-thiapyran-2-yl]-α-butenoate of formula X is characterized in that 2-(5',6'-dihydro-2'H-thiapyranyl-4'-methyl)-4-methyl-5,6-dihydro-2H-thiapyran of formula VI is condensed with alkyl 3-methyl-4-halo-2-butenoate of formula VIII in the presence of a strong base such as n-butyl lithium or the alkali metal lower alkanolates such as sodium ethylate or the alkali metal amides such as sodium amide.

Equally, an alkyl 3,11-dimethyl-7-ethyl-2,6,10-tridecatrienoate of formula I can be prepared by simultaneously effecting the reduction and desulfurization of an S,S'-dioxide of the alkyl β-methyl-γ-[4-(4'-methyl-5',6'-dihydro-2'H-thiapyranyl-2'-methyl)-5,6-dihydro-2H-thiapyran-2-yl]-α-butenoate without — reduction of the two S-oxide groups. This process is characterized in that the simultaneous reduction and desulfurization is effected by a desulfurization agent.

According to the invention, a compound of the formula X

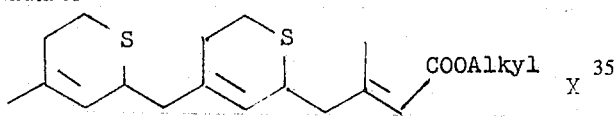

wherein alkyl has the above-assigned values, can also be prepared by treating 2-(5',6'-dihydro-2'H-thiapyranyl-4'-methyl)-4-methyl-5,6-dihydro-2H-thiapyran of the formula VI

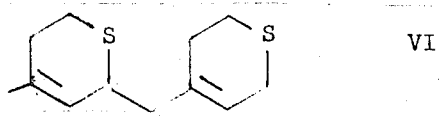

with a strong oxidizing agent, condensing the resulting corresponding sulfone of the formula XI

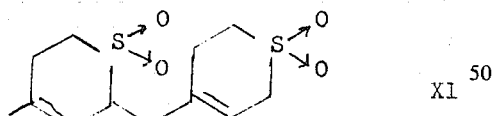

with an alkyl 3-methyl-4-halo-2-butenoate of the formula VIII in order to get a compound of the formula XII

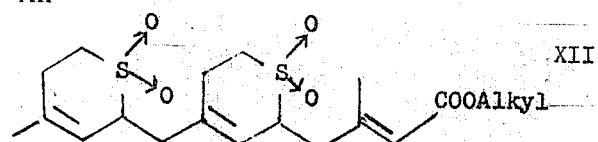

wherein alkyl has the above-assigned values, which is then treated with a reducing agent to give a compound of formula X.

The strong oxidizing agent employed above is particularly potassium permanganate or chromic acid anhydride. The mixed metal hydrides such as lithium aluminum hydride or the alkali metal borohydrides such as sodium borohydride can be utilized as the reducing agent for the reduction of compound XII.

In the actually preferred method of preparation;
1. the condensation of the compound of formula II with the compound of formula III in the first step is made in the presence of a strong base such as a lower alkyl alkali metal, for example, n-butyl lithium, or an alkali metal lower alkanolate, for example, sodium ethylate or sodium methylate, or an alkali metal amide, for example, sodium amide. The reaction is preferably conducted under anhydrous conditions in the presence of an inert organic solvent and, for example, at temperatures between about −75°C and +20°C.
2. The reducing agent employed in step 2 to act on the compound of formula IV is stannous chloride in the presence of acetyl chloride in a mixture of dimethylformamide and methyl cyanide. Titanium trichloride can also be utilized as the reducing agent.
3. The dehydrating agent with which the dehydration of the compound of formula V is effected in step 3 is phosphorus oxychloride. However, other dehydrating agents such as thionyl chloride may also be utilized. This reaction is effected in the presence of pyridine or a tertiary amine such as a collidine or a di-lower alkyl aniline.
4. The oxidation agent that is reacted with the compound of formula VI in step 4 is an oxidation agent which oxidizes the sulfur atom without oxidation of double bonds, preferably m-chloroperbenzoic acid, but sodium periodate, hydrogen peroxide or potassium permanganate can also be utilized. The reaction is effected in the presence of inert organic solvents and, for exemple, at temperatures of between 0 and −50°C.
5. The condensation of the compound of formula VII with the compound of formula VIII in step 5 is made in the presence of a strong base such as a lower alkyl alkali metal, for example, n-butyl lithium, or an alkali metal lower alkanolate, for example, sodium ethylate or sodium methylate, or an alkali metal amide, for example, sodium amide. The reaction is preferably conducted under anhydrous conditions in the presence of an inert organic solvent and, for exemple, at temperatures between about −75°C and +20°C.
6. The reducing agent with which the compound of formula IX is treated in step 6 is stannous chloride in the presence of acetyl chloride in a mixture of dimethylformamide and methyl cyanide. Titanium trichloride can also be utilized as the reducing agent.
7. The desulfurizing agent actually utilized in step 7 is nickel prepared according to the Raney method called $W_2$. It is to be understood that one can also utilize other sorts of Raney nickel such as the $W_4$ and $W_7$, or even another appropriate desulfurization agent.

The simultaneous reducing and desulfurization agent utilized in order to transform the S,S'-dioxide of alkyl β-methyl-γ-[4-(4'-methyl-5',6'-dihydro-2'H-thiapyranyl-2'-methyl)-5,6-dihydro-2H-thiapyran-2-yl]-α-butenoate into alkyl 3,11-dimethyl-7-ethyl-2,6,10-tridecatrienoate is nickel obtained by the Raney method and called the $W_2$.

The S-oxide of 4-methyl-5,6-dihydro-2H-thiapyran utilized as a starting compound in the process can be prepared by a method analogous to that described by Naylor, J. Chem. Soc. 1949, 2,754. The 1-oxa-6-thiaspiro/2,5/octane can be prepared by a method analogous to that described by Corey et al, J. Am. Chem. Soc. 87, 1353 (1965).

As can be noted, in order that the process of the invention is totally stereospecific, the geometrical configuration of the two double bonds in the 6 and 10 positions is set by inserting them into a cyclic system which subsequently is opened.

The process of the invention permits the obtaining of the following new compounds:

1. Compounds having the formula

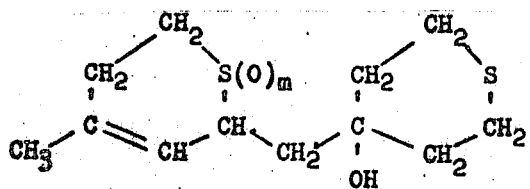

wherein m represents an integer from 0 to 2, and particularly the S-oxide of 2-(4'-hydroxy-3',4',5',6'-tetrahydrothiapyranyl-4'-methyl)-4-methyl-5,6-dihydro-2H-thiapyran (where m is 1), and 2-(4'-hydroxy-3',4',5',6'-tetrahydrothiapyranyl-4'-methyl)-4-methyl-5,6-dihydro-2H-thiapyran (where m is 0).

2. Compounds having the formula

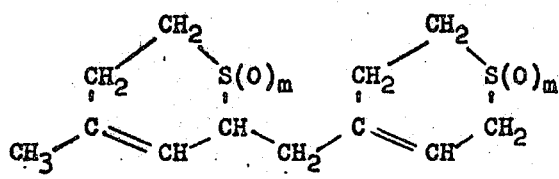

wherein m represents an integer from 0 to 2, and particularly 2-(5',6'-dihydro-2'H-thiapyranyl-4'-methyl)-4-methyl-5,6-dihydro-2H-thiapyran (where m is 0), and the S,S'-dioxide of 2-(5',6'-dihydro-2'H-thiapyranyl-4'-methyl)-4-methyl-5,6-dihydro-2H-thiapyran (where m is 1).

3. Compounds having the formula

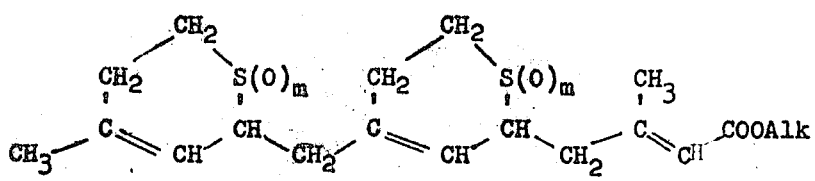

wherein m represents an integer from 0 to 2 and Alk represents an alkyl having from 1 to 5 carbon atoms, and particularly the S,S'-dioxide of methyl β-methyl-γ-[4(4'-methyl-5'',6''-dihydro-2''H-thiapyranyl-2''-methyl)-5,6-dihydro-2H-thiapyran-2-yl]-α-(E)-butenoate (where m is 1 and Alk is methyl) and methyl β-methyl-γ-[4-(4'-methyl-5'',6''-dihydro-2''H-thiapyranyl-2'-methyl)-5,6-dihydro-2H-thiapyran-2-yl]-α-(E)-butenoate (where m is 0 and Alk is methyl).

The following examples are illustrative of the practice of the invention without being limitative in any respect.

EXAMPLE

Preparation of methyl 3,11-dimethyl-7-ethyl-2,6,10-tridecatrienoate (E.E.Z. isomer)

Step A: S-oxide of 2-(4'-hydroxy-3',4',5',6'-tetrahydrothiapyranyl-4'-methyl)-4-methyl-5,6-dihydro-2H-thiapyran.

A solution of 11 gm of the S-oxide of 4-methyl-5,6-dihydro-2H-thiapyran in 300 cc of anhydrous ethyl ether was cooled to −50°C. 50 cc of n-butyl lithium in solution in hexane (1.85M) was added and the agitation was continued for several minutes. Then a solution of 11 gm of 1-oxa-6-thia-spiro/2,5/octane in 300 cc of anhydrous ethyl ether was added thereto. The reaction mixture was allowed to warm slowly to +15°C under agitation and then poured into an aqueous solution of ammonium chloride. The ethereal phase was separated and washed twice with water. The combined aqueous mother liquor and wash water phases were extracted with chloroform. The ethereal phase and the chloroform phases were combined, dried over sodium sulfate and the solvents evaporated under reduced pressure. The residue was empasted in a small volume of ethyl ether and recrystallized from 60 cc of isopropanol. 11 gm of the S-oxide of 2-(4'-hydroxy-3',4',5',6'-tetrahydrothiapyranyl-4'-methyl)-4-methyl-5,6-dihydro-2H-thiapyran were recovered in the form of white crystals melting at 130°C.

| Analysis: | $(C_{12}H_{20})_2S_2$ | Molecular weight = 260.42 | | |
|---|---|---|---|---|
| Calculated: | C% 53.34 | H% 7.73 | S% 24.62 | |
| Found: | 55.3 | 7.5 | 24.3 | |

Step B: 2-(4'-hydroxy-3',4',5',6'-tetrahydrothiapyranyl-4'-methyl)-4-methyl-5,6-dihydro-2H-thiapyran.

2.48 gm of S-oxide of 2-(4'-hydroxy-3',4',5',6'-tetrahydrothiapyranyl-4'-methyl)-4-methyl-5,6-dihydro-2H-thiapyran, 10 cc of anhydrous dimethylformamide, 20 cc of anhydrous methyl cyanide and 3 gm of stannous — chloride were mixed. This suspension was cooled between 0° and 5°C and 2 cc of acetyl chloride and 8 cc of anhydrous methyl cyanide were added slowly under agitation. The mixture remained in contact under agitation for 30 minutes and then was poured into iced water and extracted with methylene chloride. The extracts were washed with water, dried over sodium sulfate and evaporated under reduced pressure. 3 gm of resin were obtained which was purified by subjecting it to chromatography through a column of silica with elution with a benzene-acetone mixture (9:1). 2.08 gm of 2-(4'-hydroxy-3',4',5',6'-tetrahydrothiapyranyl-4'-methyl)-4-methyl-5,6-dihydro-2H-thiapyran were recovered.

M.N.R.: Spectra: presence of a methyl on the double bond at 103 Hz, ethylenic proton at 331 Hz.

Step C: 2-(5',6'-dihydro-2'H-thiapyranyl-4'-methyl)-4-methyl-5,6-dihydro-2H-thiapyran 4 cc of phosphorus oxychloride were slowly added under agitation, and while maintaining the temperature at 5°C, to a solution of 2 gm of 2-(4'-hydroxy-3',4',5',6'-tetrahyrothiapyranyl 4'-methyl)-4-methyl-5,6-dihydro-2H-thiapyran in 20 cc of anhydrous pyridine. The mixture was agitated at this temperature for 2 days. — The suspension was then poured into a water-ice-sodium bicarbonate mixture and extracted next with petroleum ether (b.p. =35°–70°C). The organic phase was washed with water, dried over sodium sulfate and evaporated under reduced pressure. 1.8 gm of a colorless oil was obtained which was subject to chromatography through a column of silica with elution with a petroleum ether (b.p. =35°-70°C)—ether mixture (97:3). 1.145 gm of 2-(5',6'-dihydro-2'H-thiapyranyl-4'-methyl)-4-methyl-5,6-dihydro-2H-thiapyran was obtained which crystallized at a temperature below −10°C.

M.N.R. Spectra: presence of a methyl on a double bond at 103 Hz, methylene toward 159.5– 165 – 170.5 Hz, ethylenic protons at 331 and 345 Hz.

Step D: The S,S'dioxide of 2-(5',6'-dihydro-2'H-thiapyranyl-4'-methyl)-4-methyl-5,6-dihydro-2H-thiapyran 2 gm of 80% m-chloroperbenzoic acid and 30 cc of methylene chloride were added slowly under agitation while maintaining a temperature of −30°C to a solution of 1.066 gm of 2-(5',6'-dihydro-2'H-thiapyranyl-4'-methyl)-4-methyl-5,6-dihydro-2H-thiapyran in 30 cc of methylene chloride. The agitation was continued for several minutes. Then the reaction mixture was poured into a diluted solution of sodium bisulfite. The organic phase was separated and washed with an aqueous solution of sodium bicarbonate. The combined wash waters were re-extracted with methylene chloride. The organic phase and the methylene chloride extracts were dried over sodium sulfate and evaporated to dryness under reduced pressure. 1.2 gm of crystals were obtained which were purified by recrystallization from tetrahydrofuran.

The crystals of the S,S'-dioxide of 2-(5',6'-dihydro-2'H-thiapyranyl-4'-methyl)-4-methyl-5,6-dihydro-2H-thiapyran, thus obtained melted at 160°C. M.N.R. Spectra: methyl on a double bond at 105 Hz, methylene in α position to sulfur or to a double bond 130 Hz to 190 Hz, towards 200 Hz a protuberance attributable to a proton in an α position to S and to a double bond, 2 ethylenic protons at 313 and 330 Hz.

Step E: The S,S'-dioxide of methyl β-methyl-γ-[4-(4'-methyl-5',6'-dihydro-2'H-thiapyranyl-2'-methyl-5,6-dihydro-2H-thiapyran-2-yl]-α-(E)-butenoate 1.45 gm of the S,S'-dioxide of 2-(5',6'-dihydro-2'H-thiapyranyl-4'-methyl)-4-methyl-5,6-dihydro-2H-thiapyran and 43 cc of anhydrous tetrahydrofuran (THF) were mixed and cooled towards −10°C. 4 cc of n-butyl lithium in hexane (1.55 M) were added under agitation and under nitrogen. The mixture was held in contact for 15 minutes, then, at this temperature, 2 cc of methyl 3-methyl-4-bromo-2-butenoate (E isomer) and 5 cc of THF were introduced slowly. The suspension was agitated for one hour while allowing the temperature to rise to 20°C. The suspension was poured into an aqueous solution of ammonium chloride, washed with ether and extracted with chloroform. The chloroform phase was washed with water, dried over sodium sulfate and evaporated to dryness under reduced pressure. 1.41 gm of a brown resin were obtained which was subjected to chromatography through a column of silica with elution with a chloroform-methanol-acetone mixture (2:1:2). 450 mg of the S,S'-dioxide of methyl β-methyl-γ-[4-(4'-methyl-5',6'-dihydro-2'H-thiapyranyl-2'-methyl)-5,6-dihydro-2H-thiapyran-2yl]-α-(E)-butenoate were obtained. M.N.R. Spectra: Presence of a methyl on a double bond at 105 Hz, ethylenic protons at 309 Hz, 325 Hz and 347 Hz, carboxymethyl at 223 Hz, methyl on a conjugated double bond at 133–134 Hz.

While operating in the same manner, but while utilizing lithium di-isopropylamide in place of butyl lithium, analogous results were obtained.

Step F: methyl β-methyl-γ-[4-(4'-methyl-5',6'-dihydro-2'H-thiapyranyl-2'-methyl)-5,6-dihydro-2H-thiapyran-2-yl]-α-(E)-butenoate.

3 gm of stannous chloride were added — under nitrogen while agitating to a suspension of 1.2 gm of the disulfoxide ester obtained in Step E in 5 cc of dimethylformamide and 10 cc of methyl cyanide. Then, at 0°C, 2 cc of acetyl chloride and 8 cc of methyl cyanide were added. The mixture was held in contact for 1 hour at this temperature, then poured into N hydrochloric acid and extracted with an ethyl ether-petroleum ether (b.p. =35°-75°C) mixture (1:1). The extract was washed, dried over sodium sulfate and evaporated to dryness under reduced pressure. 1 gm of resin was obtained which was purified by chromatography through a column of silica with elution with a petroleum ether (b.p. = 35°-70°C)-ether mixture (8:2). 650 mg of methyl β-methyl-γ-[4-(4'-methyl-5',6'-dihydro-2'H-thiapyranyl-2'-methyl)-5,6-dihydro-2H-thiapyran-2-yl]-α-(E)-butenoate were isolated.

M.N.R. Spectra: Presence of a methyl on a double bond at 101 Hz and 131 to 132 Hz, ethylenic protons at 330 Hz, 344 Hz, carboxymethyl at 220.5 Hz.

Methyl β-methyl-γ-[4-(4'-methyl-5',6'-dihydro-2'H-thiapyranyl-2'-methyl)-5,6-dihydro-2H-thiapyran-2-yl]-α-(E)-butenoate can also be obtained starting from 2-(5',6'-dihydro-2'H-thiapyranyl-4'-methyl)-4-methyl-5,6-dihydro-2H-thiapyran in the following manner.

4 cc of n-butyl lithium in hexane (1.55 M) were added under agitation and under nitrogen to a solution of 1.26 gm of 2-(5',6'-dihydro-2'H-thiapyranyl-4'-methyl)-4-methyl-5,6-dihydro-2H-thiapyran in 45 cc of anhydrous tetrahydrofuran. The mixture was allowed in contact for 15 minutes at −15°C. 2 cc of methyl 3-methyl-4-bromo-2-butenoate and 5 cc of anhydrous tetrahydrofuran were than introduced slowly at this temperature. The mixture was agitated for one hour while letting the temperature rise to 20°C. The suspension was poured into an aqueous solution of ammonium chloride and extracted with an ethyl ether-petroleum ether (b.p. =35° – 70°C) mixture (1:1). The organic phase was separated, washed with water, dried over sodium sulfate, then evaporated to dryness under reduced pressure. A resin was obtained which was purified by chromatography through a column of silica eluting with a petroleum ether (b.P. = 35° – 70°C)-ether mixture (8:2). The principal fraction was constituted by methyl β-methyl-γ-[4-(4'-methyl-5',6'-dihydro-2'H-thiapyranyl-2'-methyl)-5,6-dihydro-2H-thiapyran-2-yl]-α-(E)-butenoate.

Step G: Methyl 3,11-dimethyl-7-ethyl-2,6,10-tridecatrienoate (E.E.Z. isomer).

6 cc of an ethanolic suspension of Raney nickel $W_2$ and 4 cc of ethanol were added in the neighborhood of 0°C, to a solution of 430 mg of methyl β-methyl-γ-[4-(4'-methyl-5',6'-dihydro-2'H-thiapyranyl-2'-methyl)-5,6-dihydro-2H-thiapyran-2-yl]-α-(E)-butenoate in 40 cc of distilled acetone and the suspension was maintained in contact under agitation at this same temperature for 45 minutes. The nickel was filtered and rinsed with acetone and with alcohol. After evaporation of the solvent, 220 mg of a colorless oil were obtained which was purified by chromatography through a column of silica containing 30% of silver nitrate. The methyl 3,11-dimethyl-7-ethyl-2,6,10-tridecatrienoate (E.E.Z. isomer) thus obtained has identical constants to that of the product described by Röller, J. Am. Chem. Soc. 89, 5293 (1967).

By operating in the same manner, but while utilizing dimethylsulfoxide or diethylsulfoxide in place of acetone, analogous results were obtained.

The methyl 3,11-dimethyl-7-ethyl-2,6,10-tridecatrienote (E.E.Z. isomer) can also be obtained starting from the S,S'-dioxide of methyl β-methyl-γ-[4-(4'-methyl-5',6'-dihydro-2'H-thiapyranyl-2'-methyl)-5,6-dihydro-2H-thiapyran-2-yl]-α-(E)-butenoate in the following manner.

6 cc of an ethanolic suspension of Raney nickel $W_2$ and 4 cc of ethanol were added at 0°C to a solution of 390 mg of the S,S'-dioxide of methyl β-methyl-γ-[4-(4'-methyl-5',6'-dihydro-2'H-thiapyranyl-2'-methyl)-5,6-dihydro-2H-thiapyran-2-yl]-α-(E)-butenoate in 40 cc of acetone and allowed to remain in contact at the same temperature for 45 minutes under agitation. The nickel was separated by filtration and washed with acetone and with alcohol. The filtrate was evaporated under reduced pressure. 250 mg of a colorless oil were obtained which was purified by chromatography through a column of silica eluting with a benzenecyclohexane mixture (8:2). Methyl 3,11-dimethyl-7-ethyl-2,6,10-tridecatrienoate (E.E.Z. isomer) was obtained whose constants are identical to those of a product described by Röller, J. Am. Chem. Soc. 89, 5293 (1967).

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. A process for the production of alkyl tridecatrienoates having the formula

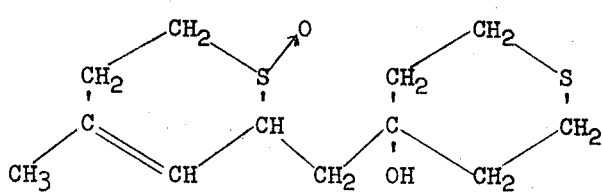

wherein Alk represents alkyl having 1 to 5 carbon atoms which consists of the steps of (1) condensing the S-oxide of 4-methyl-5,6-dihydro-2H-thiapyran with 1-oxa-6-thiaspiro/2,5/octane in the presence of a strong base, (2) reducing the resulting S-oxide of 2(4'-hydroxy-3',4',5',6'-tetrahydrothiapyranyl-4'-methyl)-4-methyl-5,6-dihydro-2H-thiapyran having the formula

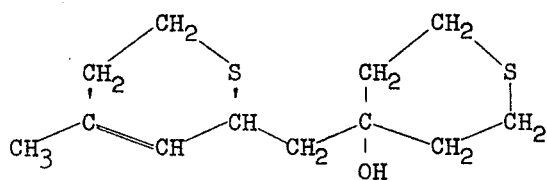

by the action of a sulfoxide reducing agent, (3) dehydrating the resulting 2-(4'-hydroxy-3',4',5',6'-tetrahydrothiapyranyl-4'-methyl)-4-methyl-5,6-dihydro-2H-thiapyran having the formula

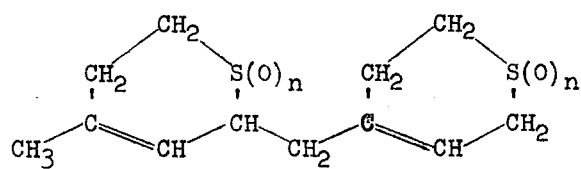

by the action of a dehydrating agent to form a dithiapyranic compound having the formula

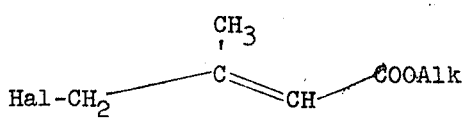

wherein n is 0 (4) and reacting the same with a butenoate having the formula

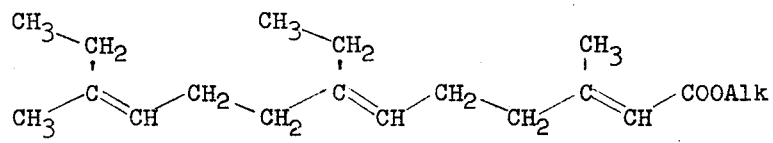

wherein Alk represents alkyl having 1 to 5 carbon atoms and Hal represents a halogen selected from the group consisting of chlorine and bromine, in the presence of a strong base, (5) subjecting the resulting dithiapyranic ester compound having the formula

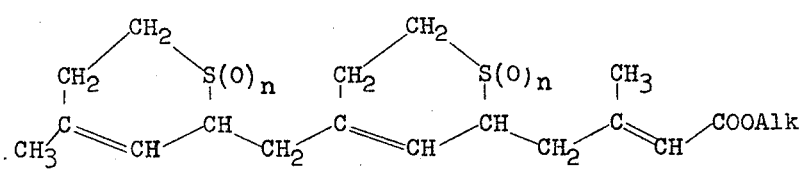

wherein alk and n have the above-assigned values, to the action of a desulfurizing agent and (6) recovering said alkyl tridecatrienoates.

2. The process of claim 1, Step 1, wherein said strong base is n-butyl lithium.

3. The process of claim 1, Step 2, wherein said sulfoxide reducing agent is stannous chloride in the presence of acetyl chloride.

4. The process of claim 1, Step 3, wherein said dehydrating agent is phosphorus oxychloride.

5. The process of claim 4 wherein said phosphorus oxychloride is employed in the presence of pyridine.

6. The process of claim 1, Step 4, wherein said strong base is n-butyl lithium.

7. The process of claim 1, Step 5, wherein said desulfurizing agent is Raney nickel $W_2$.

8. The process of claim 1, wherein said alkyl tridecatrienoates are recovered as the EEZ isomer.

9. A process for the production of alkyl tridecatrienoates having the formula

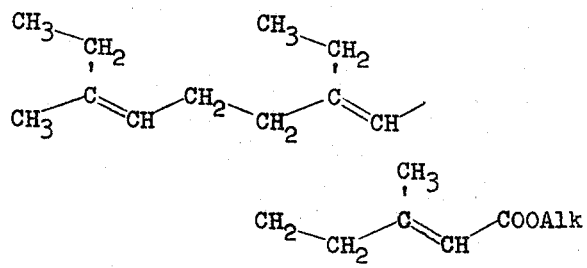

wherein Alk represents alkyl having 1 to 5 carbon atoms which consists of the steps of (1) condensing the S-oxide of 4-methyl-5,6-dihydro-2H-thiapyran with 1-oxa-6-thiaspiro/2,5/octane in the presence of a strong base, (2) reducing the resulting S-oxide of 2(4'-hydroxy-3',4',5',6'-tetrahydrothiapyranyl-4'methyl)-4-methyl-5,6-dihydro-2H-thiapyran having the formula

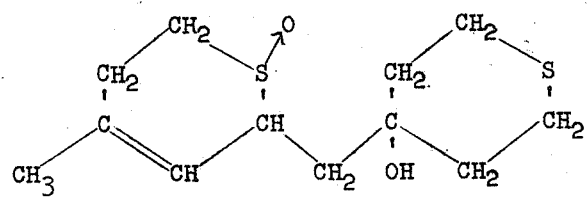

by the action of a sulfoxide reducing agent, (3) dehydrating the resulting 2-(4'-hydroxy-3',4',5',6'-tetrahydrothiapyranyl-4'-methyl)-4-methyl-5,6-dihydro-2H-thiapyran having the formula

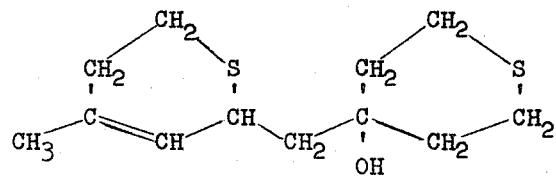

by the action of a dehydrating agent to obtain a dithiapyranic compound having the formula

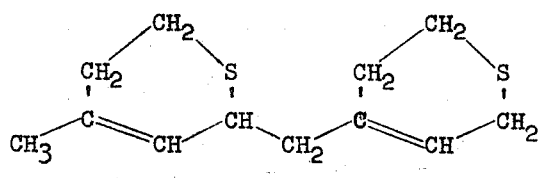

oxidizing the latter to obtain a compound of the formula

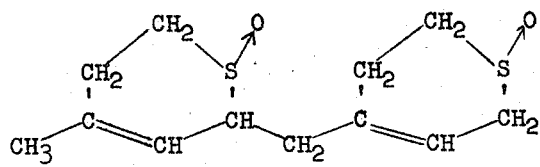

and reacting the same with a butenoate having the formula

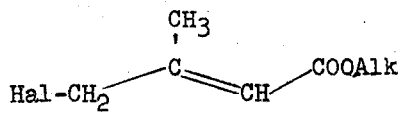

wherein Alk represents alkyl having 1 to 5 carbon atoms and Hal represents a halogen selected from the group consisting of chlorine and bromine, in the presence of a strong base, (5) subjecting the resulting dithiapyranic ester compound having the formula

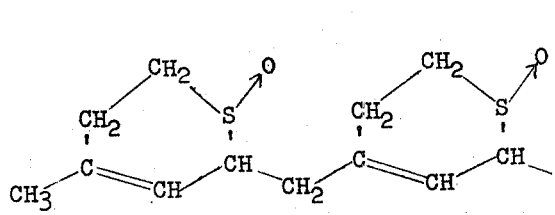

wherein Alk has the above-assigned value, to the action of a reducing agent to form a dithiapyranic ester of the formula

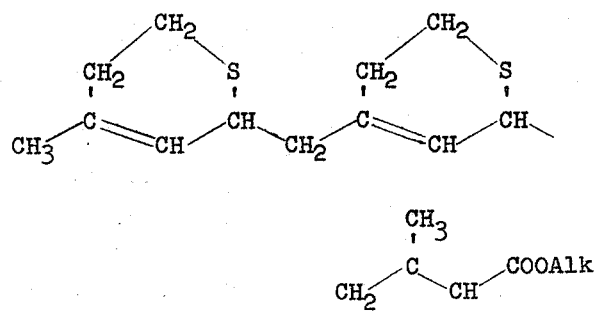

and reacting the latter with a desulfurizing agent to obtain the desired alkyl tridecatrienoate.

10. The process of claim 9 wherein the dithiapyranic ester of the formula

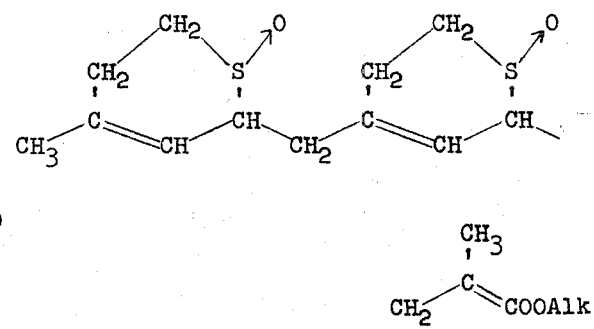

is reacted with a simultaneous reducing and desulfurizing agent to obtain the desired alkyl tridecatrienoate.

11. A process for the production of alkyl tridecatrienoates having the formula

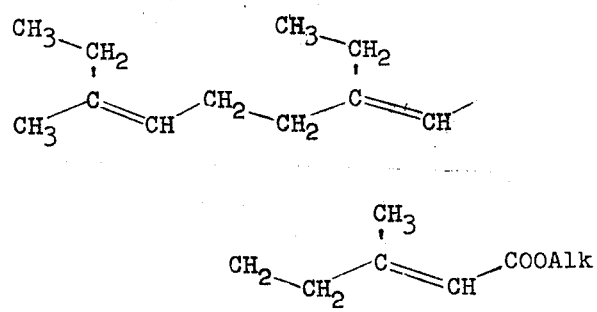

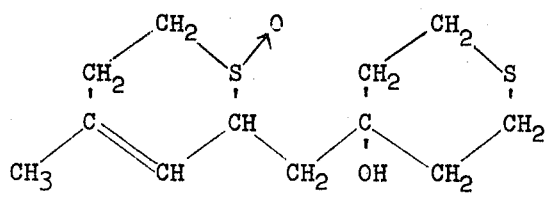

wherein Alk represents alkyl having 1 to 5 carbon atoms which consists of the steps of (1) condensing the S-oxide of 4-methyl-5,6-dihydro-2H-thiapyran with 10-oxa-6-thiaspiro/2,5/octane in the presence of a strong base, (2) reducing the resulting S-oxide of 2(4'-hydroxy-3',4',5',6'-tetrahydrothiapyranyl-4'-methyl)-4-methyl-5,6-dihydro-2H-thiapyran having the formula

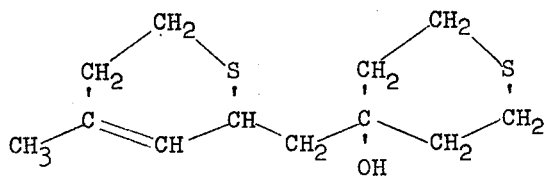

by the action of a sulfoxide reducing agent, (3) dehydrating the resulting 2-(4'-hydroxy-3',4',5',6'-tetrahydrthiapyranyl-4'-methyl)-4-methyl-5,6-dihydro-2H-thiapyran having the formula

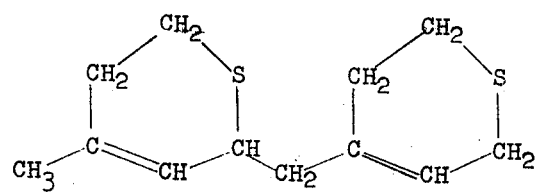

by the action of a dehydrating agent to form a dithiapyranic compound of the formula

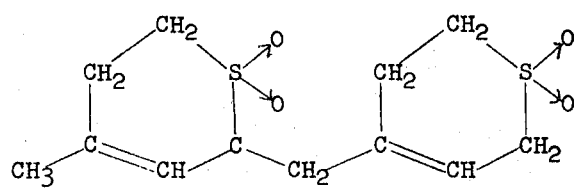

oxidizing the latter to obtain a compound of the formula and reacting the same with a butenoate having the formula

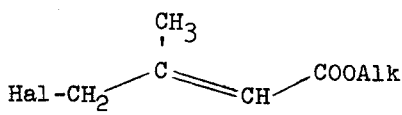

wherein Alk represents alkyl having 1 to 5 carbon atoms and Hal represents a halogen selected from the group consisting of chlorine and bromine, in the presence of a strong base, (5) subjecting the resulting dithiapyranic ester compound having the formula

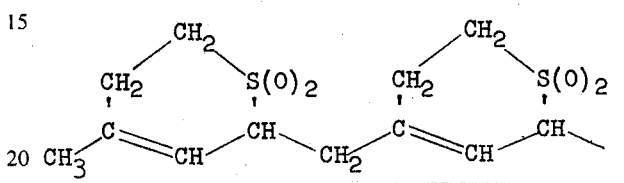

wherein Alk has the above-assigned value, to the action of a reducing agent to obtain a compound of the formula

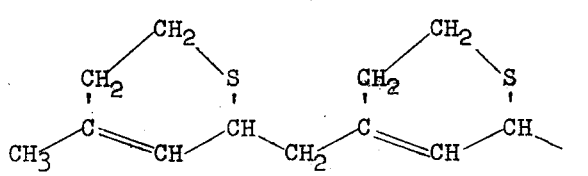

and reacting the latter with a desulfurizing agent to obtain the desired alkyl tridecatrienoate.

12. A process for the production of alkyl tridecatrienoates having the formula

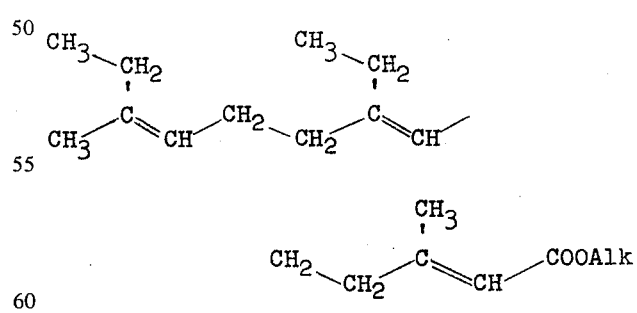

wherein Alk represents alkyl having 1 to 5 carbon atoms which consists of the steps of (1) condensing the S-oxide of 4-methyl-5,6-dihydro-2H-thiapyran with 1-oxa-6-thiaspiro/2,5/octane in the presence of a strong base selected from the group consisting of alkali metal amides, alkali metal alcoholates and lower alkyl alkali metals, (2) reducing the resulting S-oxide of 2(4-

'-hydroxy-3',4',5',6'-tetrahydrothiapyranyl-4'-methyl)-4-methyl-5,6-dihydro-2H-thiapyran having the formula

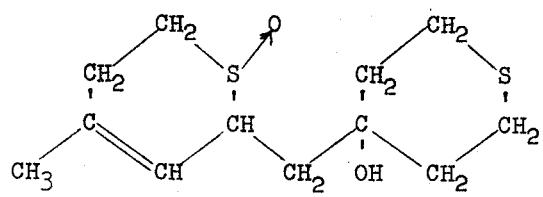

by the action of a sulfoxide reducing agent selected from the group consisting of titanium trichloride and stannous chloride in the presence of acetyl chloride, (3) dehydrating the resulting 2-(4'-hydroxy-3',4',5',6'-tetrahydrothiapyranyl-4'-methyl)-4-methyl-5,6-dihydro-2H-thiapyran having the formula

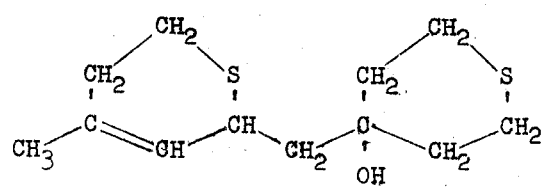

by the action of a dehydrating agent selected from the group consisting of thionyl chloride and phosphorous oxychloride to form a di-thiapyranic compound of the formula

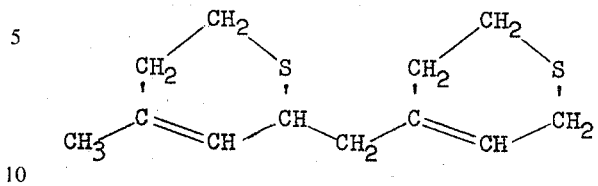

and reacting the same with a butenoate having the formula

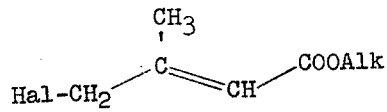

wherein Alk represents alkyl having 1 to 5 carbon atoms and Hal represents a halogen selected from the group consisting of chlorine and bromine, in the presence of a strong base selected from the group consisting of alkali metal amides, alkali metal alcoholates and lower alkyl alkali metals, (5) subjecting the resulting di-thiapyranic ester compound having the formula

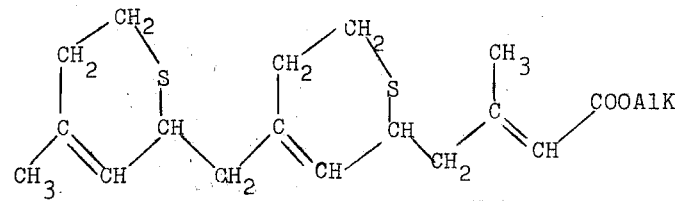

wherein Alk has the above-assigned value, to the action of a Raney nickel $W_2$ desulfurizing agent to obtain the desired alkyl tridecatrienoate.

* * * * *